though.

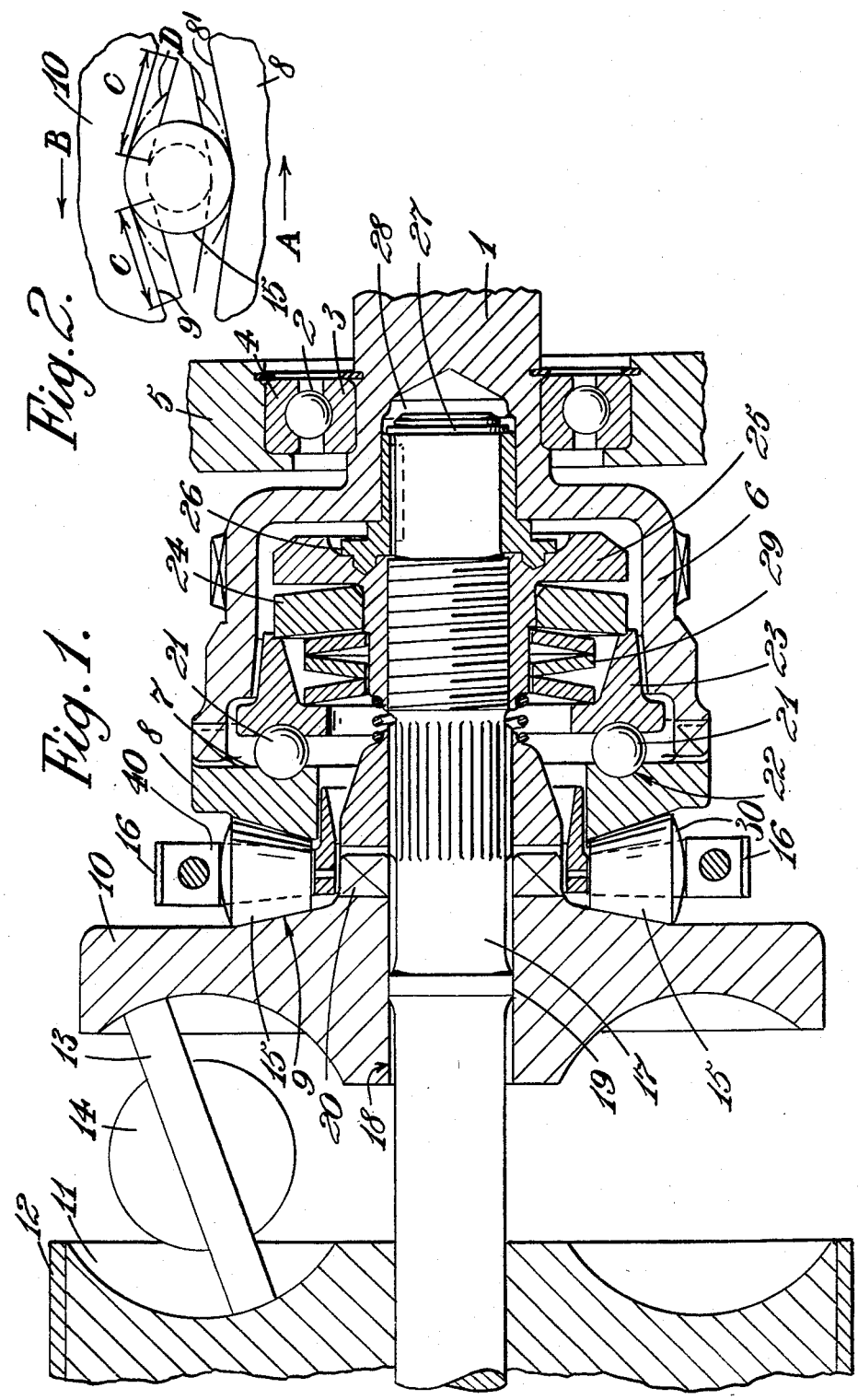

United States Patent Office 2,959,063
Patented Nov. 8, 1960

2,959,063

INFINITELY VARIABLE CHANGE SPEED GEARS

Forbes George de Brie Perry, Felbridge, near East Grinstead, England, assignor to Perbury Engineering Limited, East Grinstead, England, a British company Filed Sept. 10, 1957, Ser. No. 683,102

Claims priority, application Great Britain Sept. 11, 1956

1 Claim. (Cl. 74—208)

This invention relates to infinitely variable change speed gears, of the type having coaxial first and second torus discs connected by rollers which are rocked to vary the speed ratio of transmission, in which rocking of the rollers is effected automatically by precession and in which means is employed for generating frictional engaging pressure between the rollers and the torus disc faces, which pressure increases with the load on the input shaft to the gear. The frictional engaging pressure is obtained by compressing the rollers between the opposing faces of the two torus discs and the input torque imposes an axial load on the disc and roller system by means of a cam device which produces the axial thrust by relative axial rotation of driving and driven parts.

Gears of this type are referred to later herein as a gear of the type hereinbefore described.

In a known embodiment of gear of the type hereinbefore described, the driving and driven parts have facing cam-shaped surfaces connected by balls forming a ball bearing between the co-operating cam faces.

It has been found in practice that such a cam device is easily overloaded with consequent plastic deformation of the cam faces. As soon as appreciable deformation of the cam face occurs, the relationship between transmitted torque and axial load produced by the cam device is upset.

In consequence, the life of the gear as a whole is reduced and the operation of the gear may otherwise be impaired because incorrect pressure between the rollers and torus disc faces is generated.

The object of the present invention is to provide a new and improved infinitely variable change speed gear of the type hereinbefore described in which the cam device is not readily overloaded.

According to the present invention there is provided a gear of the type hereinbefore described having frictional engaging pressure between the rollers and torus disc faces generated by a cam device which cam device comprises a driving member connected to an input shaft, a co-axially driven member connected, by way of the first and second torus discs and intermediate rollers to an output shaft, and a plurality of roller elements arranged on axes perpendicular to the axis of the driving and driven members, the driving and driven members having facing radial surfaces connected by said roller elements and at least one of said facing radial surfaces being a cam face or said roller elements having a cam-shaped cross section. Preferably however the roller elements are circular in cross-section and both facing radial surfaces are cam faces.

The Hayes gear is a practical form of gear of the type hereinbefore described and has an input shaft which drives a pair of inwardly-facing first torus discs axially spaced about a double, outwardly-facing second torus disc connected by a drum to an output shaft. Two assemblies of rollers, roller carriers and rocker gear are provided, one between each face of the double torus disc and each of the torus discs driven from the input shaft. The means for generating frictional engaging pressure between the torus discs and the connecting rollers acts to move one of the inwardly-facing first torus discs towards the other, according to the load transferred to the input shaft, thereby compressing the double torus disc and the two sets of rollers between the outer torus discs.

A Hayes gear according to the invention, that is to say a gear of the type last described above may, according to a feature of the invention, have the driven member of its cam device connected to the first torus discs, and in this case, the driven member may conveniently be integral with one of the first torus discs.

According to a preferred form of the invention, the roller elements are tapered towards the axis of the driving and driven members. In this form of the invention, in order to restrain the roller elements radially, it is preferred to support them radially by pressure pads in a cage, the pads bearing on curved surfaces formed on the outer faces of the roller elements.

Conveniently, three roller elements are provided spaced from each other by 120° about the axis of the driving and driven members. When the driven member is integral with one of the torus discs, this latter arrangement has the advantage of being self-centering.

When the roller elements are circular in cross-section, and both facing radial surfaces are cam faces it is preferred that the cam faces are made up of two linear portions, associated with each roller element and providing for relative axial rotation in either sense, and an intermediate transition portion comprising a curve which, at all points, has a radius greater than the radius of the roller element part in contact therewith. That is to say, if the rollers are tapered, the cam faces are shaped accordingly but the transition curve radius is always greater than the roller radius at the same distance from the axis of the driving and driven members.

An embodiment of the invention will now be described, by way of example, with reference to the accompanying drawings, of which:

Figure 1 is a longitudinal sectional view of a part of a Hayes gear and

Figure 2 is a diagram referred to in the description of the cam device shown in Figure 1.

In the gear of Figure 1, an input shaft 1 is supported at the gear end by a bearing 2 having its inner race 3 mounted on the input shaft 1 and its outer race 4 carried in an inwardly extending flange 5 of a casing, not shown in the drawing, which extends coaxially with the gear enclosing the gear parts.

The gear end of the input shaft 1 is formed as a drum 6 terminated in dogs 7 to which the driving member 8 of a cam device is dogged. The driving member 8 is provided with a cam face, a co-operating and facing cam face being formed on the face 9 of a torous disc 10 which forms the driven member of the cam device. The torus disc 10 is one of a pair of inwardly-facing first torus discs axially spaced about a double, outwardly-facing second torus disc 11, connected by a drum 12 to an output shaft, not shown.

Two assemblies of rollers, roller carriers and rocker gear are provided, one between each face of the double torus disc 11 and each of the first torus discs 10. One roller 13 and its associated roller carrier 14 are shown in the drawing; the roller 13 and roller carrier 14 are one of three rollers and carriers of one of the two assemblies, each roller 13 being radially spaced by 120° about the drive shaft axis.

The driving member 8 and the driven member 10 of the cam device are connected by a number of cam following roller elements, of which one is shown at 15. These roller elements 15 are provided with curved surfaces 30, formed on their outer ends, by which the roller elements are engaged and radially restrained by pressure pads 16 which are integral with the roller cage 40.

The torus disc 10 is carried on a drive shaft 17, the inner face 18 of the disc resting on a land 19 formed on the shaft. The torus disc 10 is rotationally fixed to the drive shaft 17 by dogs shown at 20; however, the torus disc 10 is free to make limited axial and angular movement relatively to the shaft.

The driving member 8 of the cam device is retained by a thrust bearing 21, one race of which is machined on the opposite face of the driving member 8 from the cam face and the other race 23 of which bears against one face of a dished washer or Belleville spring 24. The other face of the Belleville spring 24 bears against a flanged nut 25 mounted on the drive shaft 17 and fixed against axial movement relatively to the drive shaft 17. A flanged bearing 26 is mounted on the input end of the drive shaft 17 and locks the flanged nut 25. The bearing 26 is retained by a circular spring clip 27 and provides a bearing surface against the inner surface of a recess 28 formed in the gear end of the input shaft 1, wherein the input end of the drive shaft 17 is retained.

Further Belleville springs 29 provide the initial axial loading of the roller system interconnecting the torus discs. When the gear is assembled, flanged nut 25 is tightened on the drive shaft 17 compressing the Belleville springs 29 until the outer end of the Belleville spring 24 abuts against the face of the member 23 of the thrust bearing 21. Beyond this position, further compression of the Belleville springs 29 is possible only by compressing also the Belleville spring 24. This adjustment of initial axial loading is, in consequence, easily found. The flanged nut 25 is then locked in this position by the flanged bearing 26.

Figure 2 is a diagram of the cam device representing a developed view of the driving and driven members and one roller element in the direction of the roller element axis towards the drive shaft axis. The parts shown are correspondingly referenced as in Figure 1.

Assuming that the driving member 8 is rotated in the direction of the arrow A, the driven member 10 will be rotated in the same direction. However, reaction of the output load will tend to rotate the driven member 10 in the direction of the arrow B. Consequently, relative rotation will occur between the two members the roller element 15 producing a thrust against the cam faces tending to separate the driving and driven members.

The roller elements 15 are tapered towards the axis of the drive shaft 17 and the cam faces 9 and 8' are shaped accordingly, being more widely separated at a greater radius from the drive shaft 17.

The opposing cam faces 9 and 8' each comprise two linear portions extending on each side of a transition portion. The linear portions provide for relative axial rotation of the driving and driven members in either direction. The transition portion is of greater radius at all points than the roller element radius at the same radial distance from the axis of the drive shaft 17 and provides for transition of relative axial rotation from one sense to the other without shock. The linear portions of the cam faces are shown at C and the transition portions at D.

Only one roller element 15 is shown in the view of Figure 2, but it will be understood that the cam faces are similarly shaped for each of the roller elements; that is, each cam face is provided with six linear portions joined in pairs by three transition portions displaced equally around the cam faces.

The thrust produced is transferred through the thrust bearing 21 and flanged nut 25 to the drive shaft 17 to which the other first torus disc, not shown in the drawings, is fixed against axial movement. The thrust is thus developed between the faces of the first torus discs and tends to compress the rollers between these faces and second torus disc.

Due to the angle of taper of the roller elements 15 they are angularly and radially self aligning on the cam faces 9 of the torus disc 10 and for this purpose, both the roller sides and the various portions or the cam faces 9 are truly straight in profile. In order to ensure alignability and proper loading of the driving member 8, however the various portions of the cam face of the member 8 are barrelled slightly in profile. The barrelling is very slight and selected so that full load on the cam drive results in the contact line between the rollers and the cam faces of the member 8 extending the full length of the roller side.

Angular alignability of the member 8, which follows the angular alignment of torus disc 10, is allowed by differential flexure of the Belleville washer 24.

I claim:

A cam device for transmitting drive and axial load to a torus disc of an infinitely variable change speed gear, which cam device comprises a driving member having a first cam face, a first set of cam surfaces formed on said first cam face, a driven member coaxial with said driving member and having a second cam face facing said first cam face, a second set of cam surfaces formed on said second cam face, and a plurality of linearly tapered circular sectioned roller elements arranged with their axes perpendicular and tapering toward the axis of said driven member, and each engaged between a cam surface of said first set and a cam surface of said second set, wherein each cam surface comprises two camming portions and a transition portion between said two camming portions, which transition portion is of greater radius at all points than the roller element radius at the same radial distance from the axis of said driving member.

References Cited in the file of this patent
UNITED STATES PATENTS

| | | |
|---|---|---|
| 1,774,176 | Erban | Aug. 26, 1930 |
| 1,999,543 | Madle | Apr. 30, 1935 |
| 2,030,203 | Gove et al. | Feb. 11, 1936 |
| 2,125,998 | Erban | Aug. 9, 1938 |
| 2,132,726 | Ehrlich | Oct. 11, 1938 |